(12) United States Patent
Masefield

(10) Patent No.: US 10,063,462 B2
(45) Date of Patent: Aug. 28, 2018

(54) **METHODS FOR DETERMINING THE SHORTEST PATH OF A NETWORK UTILIZING M* ALGORITHM**

(71) Applicant: Ben Masefield, Albuquerque, NM (US)

(72) Inventor: Ben Masefield, Albuquerque, NM (US)

(73) Assignee: Solveering LLC, Albuquerque, NM (US)

( * ) Notice: Subject to any disclaimer, the term of this patent is extended or adjusted under 35 U.S.C. 154(b) by 79 days.

(21) Appl. No.: 14/941,595

(22) Filed: Nov. 14, 2015

(65) Prior Publication Data

US 2016/0352615 A1 Dec. 1, 2016

Related U.S. Application Data

(60) Provisional application No. 62/169,423, filed on Jun. 1, 2015.

(51) Int. Cl.
*H04L 12/721* (2013.01)
*H04L 12/26* (2006.01)

(52) U.S. Cl.
CPC .............. *H04L 45/14* (2013.01); *H04L 45/12* (2013.01); *H04L 43/0811* (2013.01)

(58) Field of Classification Search
CPC ..... H04L 45/12; H04L 45/122; H04L 41/145; H04L 45/123
See application file for complete search history.

(56) References Cited

U.S. PATENT DOCUMENTS

| | | | | |
|---|---|---|---|---|
| 7,313,095 B1* | 12/2007 | Nucci | ................... | H04L 41/142 370/229 |
| 7,756,043 B1* | 7/2010 | Nucci | ................... | H04L 41/142 370/238 |
| 2005/0201285 A1* | 9/2005 | Simonis | .............. | H04L 12/2602 370/235 |
| 2009/0201899 A1* | 8/2009 | Liu | ......................... | H04L 45/24 370/338 |
| 2011/0103398 A1* | 5/2011 | Mitsunobu | .............. | H04L 45/00 370/458 |

* cited by examiner

*Primary Examiner* — Hassan Kizou
*Assistant Examiner* — Abdullahi Ahmed
(74) *Attorney, Agent, or Firm* — White-Welker & Welker, LLC; Matthew T. Welker, Esq.

(57) ABSTRACT

A computer implemented method for determining a characteristic of a network, the network having a plurality of vertices and a plurality of connections, where at least one of the plurality of vertices is defined as a starting vertex, and at least one of the plurality of vertices is defined as a destination vertex, the method having the steps of: allocating a cost value to each connection, a potential value to the starting vertex and a potential value to the destination vertex, executing an inverse system matrix related to the flow of the network, calculating the relative flow of a connection over all neighboring vertices of each vertex, and determining the characteristic of a network by evaluating the relative flow of each connection.

20 Claims, 6 Drawing Sheets

METHODS FOR DETERMINING THE SHORTEST PATH OF A NETWORK UTILIZING M* ALGORITHM

CROSS-REFERENCE TO RELATED APPLICATION

This application claims the benefit of U.S. Provisional Application No. 62/169,423 filed on Jun. 1, 2015, which is incorporated herein by reference in its entirety.

BACKGROUND

In graph processing, a graph or network can have a set of vertices connected by a set of connectors. The connectors can have corresponding costs incurred associated with traversing the connection. The network can represent or be applied to many real-world conditions, for example, road networks, electronic circuitry, social media networks, computer networks, or the like. The determination of characteristics of the network, for example, the connectivity between two vertices and/or shortest path between two vertices, is desired. For networks with a large number of vertices and connectors, the determination of connectivity and the shortest paths between vertices is a time consuming problem and can require significant computing resources.

SUMMARY OF THE INVENTION

The present disclosure pertains to a computer implemented method for determining a characteristic of a network, the network having a plurality of vertices and a plurality of connections, where at least one of the plurality of vertices is defined as a starting vertex, and at least one of the plurality of vertices is defined as a destination vertex, the method having the steps of: allocating a cost value to each connection, a potential value to the starting vertex and a potential value to the destination vertex, executing an inverse system matrix related to the flow of the network, calculating the relative flow of a connection over all neighboring vertices of each vertex, and determining the characteristic of a network by evaluating the relative flow of each connection.

One aspect of the disclosure is the step of generating an inverse system matrix having the steps of: building a graph using:

$$\Sigma i_x = 0$$

and $$i_{x \to y} = \frac{U_x - U_y}{P_{x,y}}$$

where $i_x$ is the flow over all of a vertex, $i_{x \to y}$ is the directional flow from a vertex X to an adjoining vertex Y, $U_x$ is the potential of vertex X, $U_y$ is the potential of vertex Y, and $P_{x,y}$ is the cost of the connection between vertex X and vertex Y, minimizing to Mk=s, where M is a matrix of size (n+1)×(n+1), k defines the potentials $U_x$ and $U_y$, and s defines the flow, applying an offset matrix to the system matrix resulting in an offset system matrix, and inverting the offset system matrix resulting in the inverse system matrix.

Another aspect of the disclosure is a method where the characteristic of the network is the shortest path, the shortest path starts at a starting vertex and ends at a destination vertex, and the offset matrix is applied with one non-zero element on the diagonal.

Another aspect of the disclosure is a method where the step of evaluating the relative flow of each connection evaluates the relative flow of each connection over all neighboring vertices of each vertex, said step having the steps of:
(a) defining the starting vertex as a current vertex,
(b) identifying the connection with the highest relative flow,
(c) assigning the connection with the highest relative flow and neighboring vertex adjoining the connection with the highest relative flow to the shortest path, and
(d) if the current vertex is not the destination vertex, repeat steps (a)-(c).

Another aspect of the disclosure is where the characteristic of the network is the connectivity between two vertices of a network and an offset matrix is added with all non-zero elements on the diagonal.

Another aspect of the disclosure is where the step of evaluating the relative flow of each connection evaluates the relative flow of each connection over all neighboring vertices of each vertex, said step comprises the steps of: determining the value of the element in the inverse system matrix corresponding to two vertices of the network, and identifying the connectivity between the two vertices of the network, where connectivity exists if the value of the element is not zero and connectivity does not exist if the value of the element is zero.

Another aspect of the disclosure is a method having the step of assigning a directional flow to each connection. Another aspect of the disclosure is a method where the step of building a graph uses:

$$G_{x,y} \stackrel{def}{=} \frac{1}{P_{x,y}}$$

where $G_{x,y}$ is the fluidity of a connection and $P_{x,y}$ is the cost of a connection.

Another aspect of the disclosure is a method where the step of building a graph uses:

$$G'_{x,y} \stackrel{def}{=} \omega(x, y) \times G_{x,y} \equiv \frac{\omega(x, y)}{P_{x,y}}$$

where $G'_{x,y}$ is the directional fluidity of a connection and $\omega(x,y)$ is the connectivity scalar between a vertex X and a vertex Y, the connectivity scalar indicating whether a connection exists between vertex X and vertex Y.

Another aspect of the disclosure is a method where the step of building a graph uses:

$$\tau(x) := \begin{cases} \text{Source} \to \tau(x) = -1 \\ \text{Sink} \to \tau(x) = 1 \\ \text{Otherwise} \to \tau(x) = 0 \end{cases}$$

where $\tau(x)$ is the terminal scalar for indicating a net flux of flow of the network at the vertex X.

BRIEF DESCRIPTION OF THE DRAWINGS

The accompanying drawings, which are incorporated herein and form part of the specification, illustrate various embodiments of the present invention and together with the description, further serve to explain the principles of the invention and to enable a person skilled in the pertinent art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION

In the following detailed description, reference is made to the accompanying drawings which form a part hereof and in which is shown by way of illustration specific embodiments in which the invention may be practiced. These embodiments are described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined by the appended claims.

The following describes a method of determining a characteristic of a network utilizing an algorithm. The method is used to determine a characteristic of a network of vertices (nodes) and connections that models real-world conditions as a set of relationships among a tangible network. The network can represent documents and links on the Internet, a computer network topology, world-wide-web communications, telephone communications, electrical grids, computer games, robotics networks, transportation routes in a geographic map, a social network, computer aided engineering applications where functions are performed in at least two dimensional space, or the like. The characteristic of a network can be the shortest path of a network between a starting vertex and another vertex in the network, and/or the connectivity between a starting vertex and another vertex in the network. In some embodiments, the method is used to analyze the modeled conditions in order to determine a shortest path between a starting vertex and another vertex in the network, for example, a destination vertex. The path determined is not the shortest possible path, but rather the shortest desired path. In some embodiments, the method is used to determine a set of shortest paths between at least one starting vertex and all vertices of the network. In some embodiments, the method is used to determine whether there is a connection between a starting vertex and another vertex in the network, for example, a destination vertex. In some embodiments, the method may apply an algorithm at least one time to the network. In some embodiment, the method has the step of determining a characteristic of a network utilizing an inverse system matrix.

Figure 1:
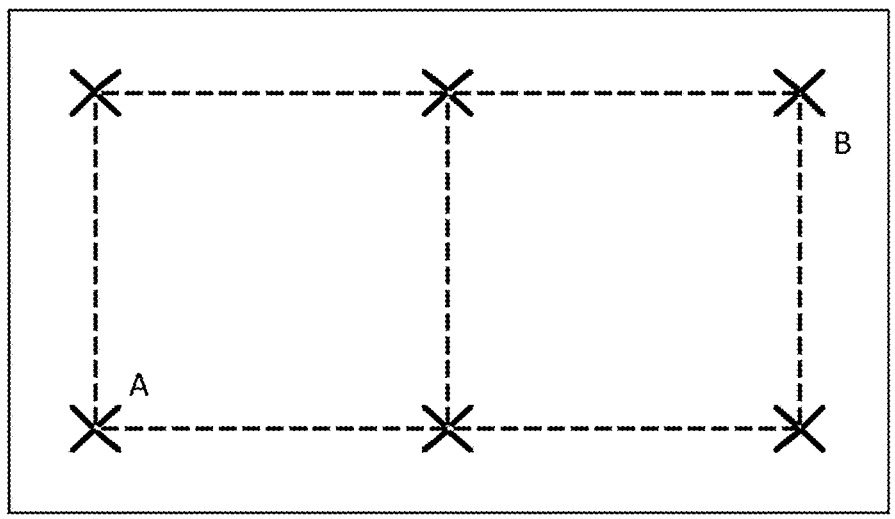
FIG. 1 is a representation of a network according to an exemplary embodiment.

As shown in FIG. 1, the network is represented as a set of vertices, interconnected by a set of connections. The network can be anything formulated on a discrete space, such as a graph, image, or the like. Each vertex has at least one connection adjoining the vertex. Each vertex is associated with a potential and identified by a vertex identifier.

The connections are associated with their adjoining vertices. A connection can span two vertices, that is, a connection on the network is positioned between one vertex on the network and another vertex on the network. Thus the connection is uniquely defined by the adjoining vertices. Each connection is associated with a cost parameter, flow parameter, and a connection identifier. The cost can represent the effort, loss, or sacrifice necessary to traverse between two vertices. The cost can be any characteristic associated with effort, loss, or sacrifice, for example, without limitation, distance between the vertices, time, energy, monetary value, resistance, or the like. A path with the least cumulative cost from the starting vertex to the destination vertex is referred to herein as the "shortest" path where the term "shortest" is used in the context that the cost is minimized though it is possible that a shorter path may exist in some embodiments. In one embodiment, the method has the step of allocating a cost value to each connection.

A flow parameter is considered as a way to evaluate the overall cost across the connection as it relates to the start and destination vertex. The flow across each connection is directional, that is the flow is a function of the vertex potentials and the value of the cost across the connection. The direction is a function of the indices of the vertices of that connection. The flow can be a positive flow or a negative flow. At least one vertex can have a source flowing into the vertex and at least one vertex can have a sink of flow leaving the vertex. The source flow is a source that causes a net flow to enter the system. The sink causes the net flow to leave the system. In some embodiments, the method has the step of allocating a potential value to the starting vertex. In some embodiments, the method has the step of allocating a potential value to the destination vertex.

Figure 2:
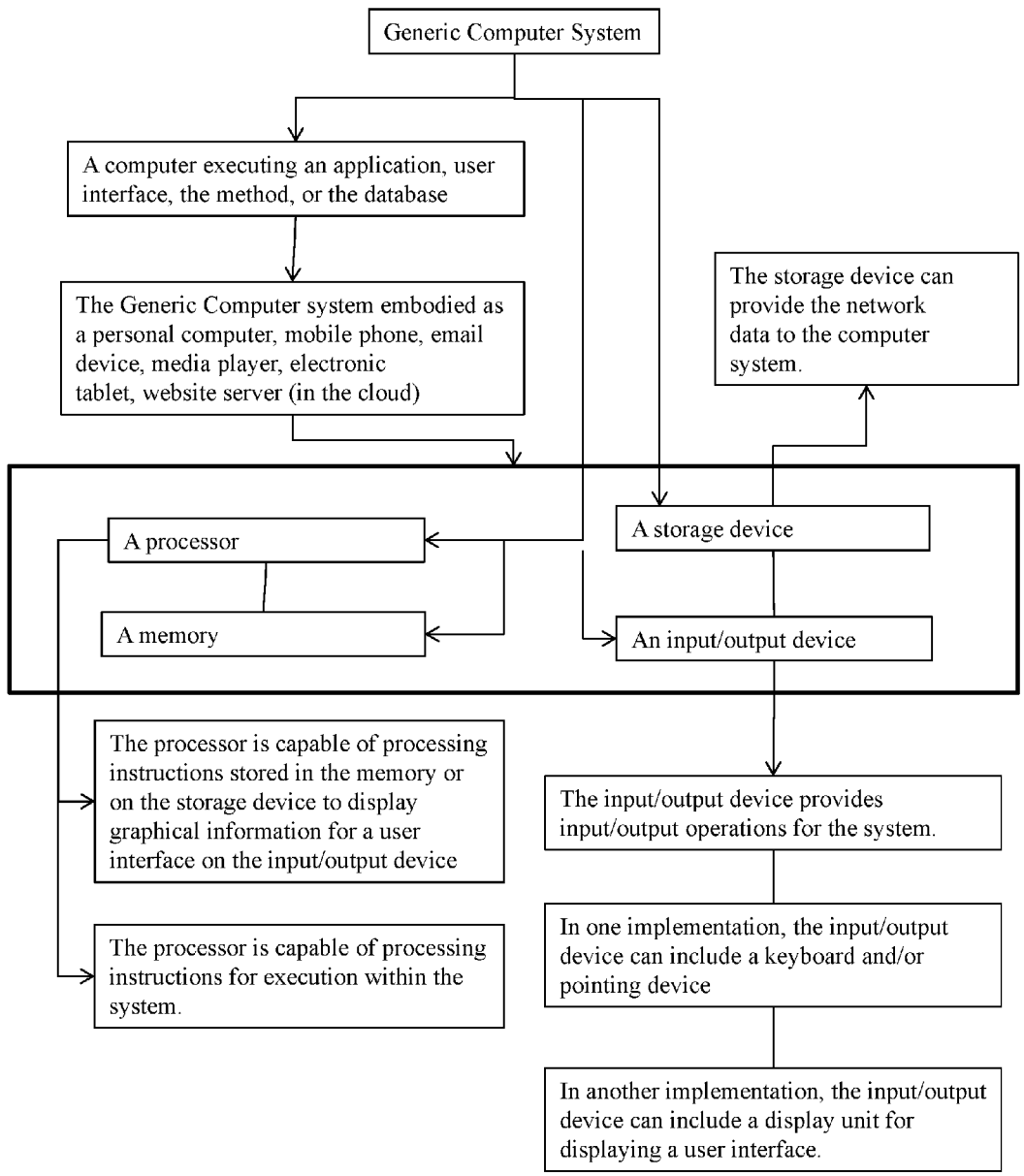
FIG. 2 is a representation of an electronic device according to an exemplary embodiment.

FIG. 2 is a schematic diagram of an example of a generic computer system. The system can be used for the operations described in association with the method according to one implementation. For example, the system may include either or all of a computer executing an application, user interface, the method, or the database. The system can be included in a personal computer, mobile phone, email device, media player, electronic tablet, website server (in the cloud) or any other computing device.

In some implementations, the system can include a processor, memory, a storage device, and an input/output device. Each of the components are interconnected using a system bus. The processor is capable of processing instructions for execution within the system. The processor is capable of processing instructions stored in the memory or on the storage device to display graphical information for a user interface on the input/output device. In some implementations, the system can include multiple processors or processing cores.

The memory can store information within the system. In one implementation, the memory can be a computer-readable medium. In one implementation, the memory can be a volatile memory unit. In another implementation, the memory can be a non-volatile memory unit.

The storage device can be capable of providing mass storage for the system. The storage device includes one or more systems that stores the data related to the network or a portion of the data related to the network. The storage device can provide the network data to the computer system. The storage device can store the data related to the algorithm, for example, without limitation, data describing the network, vertex identifiers, vertex values, connection identifiers, connection values, matrix values, matrix identifier, or the like. In one implementation, the storage device can be a computer-readable medium. In various different implementations, the storage device can be a CD ROM, DVD, a hard disk device, an optical disk device, a tape device, micro disk, or thumb drive.

The input/output device provides input/output operations for the system. In one implementation, the input/output device can include a keyboard and/or pointing device such as a mouse or a trackball. In another implementation, the input/output device can include a display unit for displaying a user interface.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

In some embodiments, the computer program can have an algorithm for determining the shortest path from an origination vertex to a destination vertex. In some embodiments, the algorithm is the M* algorithm. The computer program can execute the algorithm in relation to a network in order to determine the shortest path from an origination vertex to a destination vertex in the network. The algorithm may be a part of the user program received from the computer system. The computer program can save the output from the M* algorithm to the storage system.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits), FPGAs (Field Programmable Gate Arrays) or, the like.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

As is known in the art, the computer system is adapted to execute computer program modules for providing functionality described herein. As used herein, the term "module" refers to computer program logic utilized to provide the specified functionality. Thus, a module can be implemented in hardware, firmware, and/or software. In some embodiments, program modules are stored on the storage device, loaded into the memory, and executed by the processor.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 4:
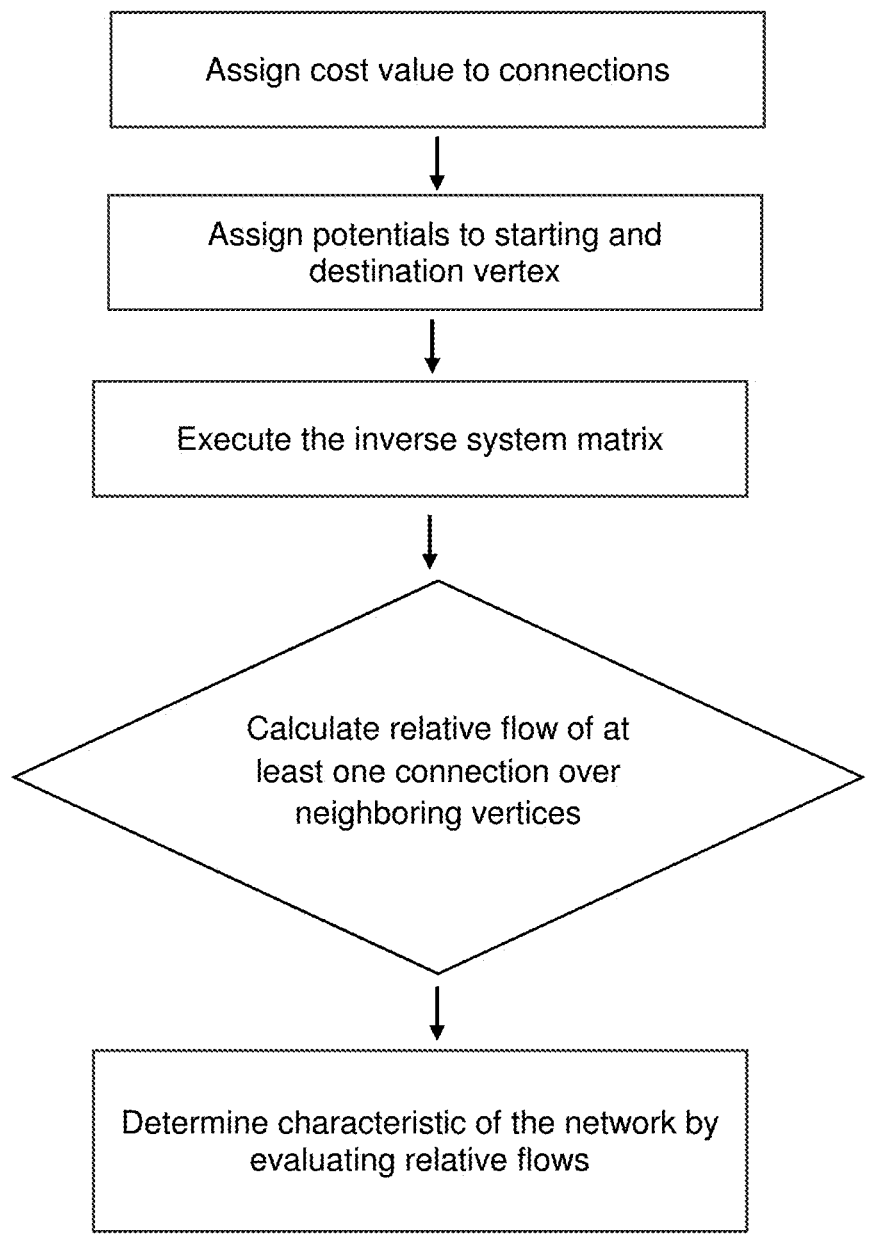
FIG. 4 is a representation of a flow chart according to an exemplary embodiment.
Figure 5:
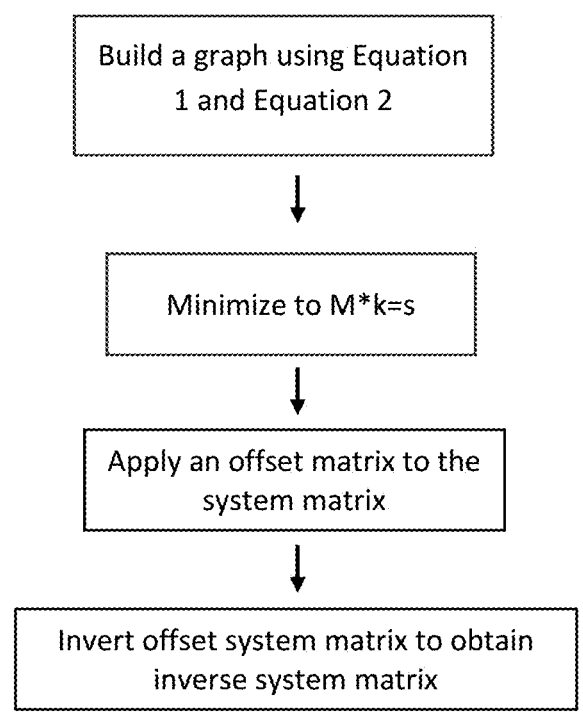
FIG. 5 is a representation of a flow chart according to an exemplary embodiment.
Figure 6:
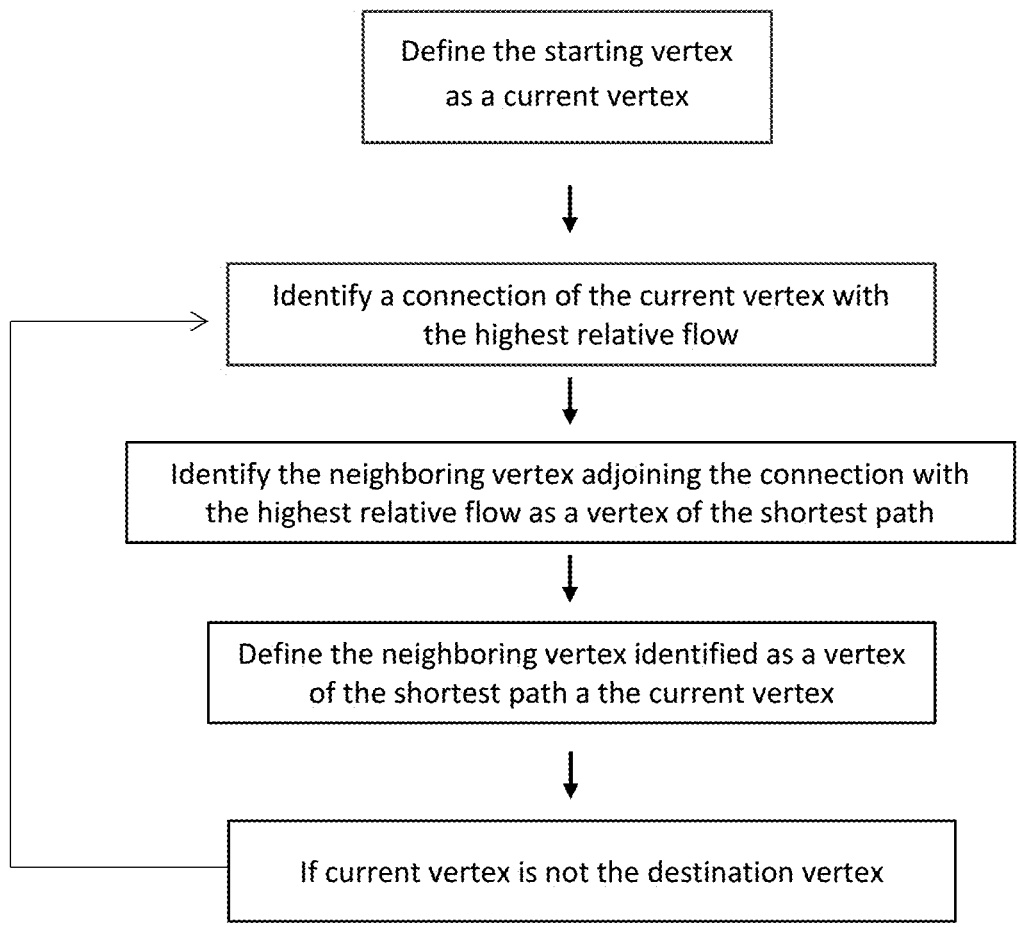
FIG. 6 is a representation of a flow chart according to an exemplary embodiment.

In some embodiments, as shown in FIGS. 4-6, the method can be performed as follows. A network may be represented by $$Z=(V,C)$$

where V represents the set of vertices in the network and C represents the set of connections in the network. An example of such a network is shown in FIG. 1Error! Reference source not found., with the connections within the network given by the dashed lines and the vertices, shown as an X, the intersection of at least two connections, where the network has starting vertex A and destination vertex B.

In some embodiments, the method has the step of generating an inverse system matrix. A system matrix, identified as M, is a square matrix of size n+1, where n+1 is the number of vertices in the system (identified as vertex 0 through vertex n). While the starting vertex is identified as vertex 0, the starting vertex can be any vertex in the network. The system matrix has n+1 number of rows and n+1 number of columns based. The calculations that generate M take into account the connections amongst vertices but the final size of the system matrix is independent of the number of connections and is dependent on the number of vertices.

A graph of the potential values at each vertex can be built using:

$$\Sigma i_x = 0 \quad \text{Equation 1}$$

and $$i_{x \to y} = \frac{U_x - U_y}{P_{x,y}} \quad \text{Equation 2}$$

where x is used to describe the vertices in the range 0 through n, $i_x$ represents the flow entering and/or leaving a vertex x, and $i_{x \to y}$ is the directional flow from a vertex x to its adjoining vertex x, $U_x$ is the potential of vertex x, $U_y$ is the potential of vertex y, and $P_{x,y}$ is the cost of the connection between vertex x and vertex y. Flow entering a vertex can be represented as a positive quantity and flow leaving a vertex can be represented as a negative quantity.

While Equation 1 and Equation 2 define the system of equations that are to be solved, the form of these equations is not in a preferable form and thus an equivalent representation is presented. Each vertex x is associated with $$\omega(x,0) \times i_{x \to 0} + \omega(x,1) \times i_{x \to 1} + \ldots + \omega(x,n) \times i_{x \to n} = \tau(x) \times i_s \quad \text{Equation 3}$$

where x is the index of the current vertex (with the index going from 0 to n), n is the number of vertices, $i_{x \to y}$ is the directional flow from a vertex x to one of its adjoining vertices y, is $i_s$ the source/sink flow, $\tau(x)$ is the termination scalar, and $\omega(x,y)$ is the connectivity scalar between a vertex x and a vertex y. In some embodiments, where the flow enters a vertex, the flow is positive. In some embodiments, where the flow leaves the vertex, the flow is negative. The association of each vertex with Equation 3 results in a set of equations that are solved simultaneously to determine the potentials within the network.

The term $\tau(x)$ is defined as $$\tau(x) := \begin{cases} \text{Source} \to \tau(x) = -1 \\ \text{Sink} \to \tau(x) = 1 \\ \text{Otherwise} \to \tau(x) = 0 \end{cases} \quad \text{Equation 4}$$

In one embodiment, the termination scalar can indicate a net flux of flow into or out of the system, for example, where the value of the termination scalar is 1 the current vertex is a destination vertex, where the value of the termination scalar is −1 the current vertex is a starting vertex and, where the value of the termination scalar is 0 there is only flow amongst neighboring vertices.

In one embodiment, the connectivity scalar indicates whether a connection exists between two vertices. In one embodiment, $\omega(x,y)$ indicates the existence of a connection between a vertex x and a vertex y according to:

$$\omega(x,y) := \begin{cases} \text{if connection } x \leftrightarrow y \to \omega(x,y) = -1 \\ \text{if no connection } x \leftrightarrow y \to \omega(x,y) = 0 \end{cases} \quad \text{Equation 5}$$

where, if $\omega(x,y)$ is zero there is no connection between vertex x and a vertex y and if $\omega(x,y)$ is −1 there is a connection between a vertex x and a vertex y. In one embodiment, where x=y, $\omega(x,y)$ falls out of the equation because Ux=Uy. The sign of $\omega(x,y)$ is, without limitation, an arbitrary convention adopted here and the result could equally be used for a case where its negative form were applied. In one embodiment, the use of $\omega(x,y)$ is equivalent to stating that $P_{x,y}$ is infinite where it is not defined.

The terms $\tau(x)$ and $\omega(x,y)$ are purely mathematical tools to allow the process to be represented in a generic form. They represent a conditional argument that allow the specific terms to be kept where the associated vertex is defined as either a starting vertex or a destination vertex, but can result in the removal of terms that are not associated with a starting vertex of a destination vertex.

In one embodiment, Equation 2 can be rewritten utilizing $$G_{x,y} \stackrel{def}{=} \frac{1}{P_{x,y}} \quad \text{Equation 6}$$

where $G_{x,y}$ is the fluidity of a connection and $P_{x,y}$ is the cost of a connection and by incorporating the connectivity scalar into Equation 6, resulting in:

$$G'_{x,y} \stackrel{def}{=} \omega(x,y) \times G_{x,y} \equiv \frac{\omega(x,y)}{P_{x,y}} \quad \text{Equation 7}$$

where $G'_{x,y}$ is the directional fluidity, x and y are the indices of vertex x and vertex y that define the connection between vertex x and vertex y. Utilizing Equation 7, Equation 2 can be rewritten as $$i_{x \to y} = G'_{x,y} \times (U_x - U_y) \quad \text{Equation 8}$$

which is valid by the fact that $i_{x \to y}$ is only defined for regions where there is a connection between vertex x and vertex y. In some embodiments, the magnitude of the directional fluidity can be identical to the inverse cost of the connection from vertex y to vertex x, for example, without limitation, where the connection is a one-way connection. For those cases, the magnitude of the fluidity from vertex x to vertex y would be different from the magnitude of the fluidity from the vertex y to vertex x. The use of Equation 4, Equation 5, Equation 6, Equation 7, and Equation 8 is not a requirement but rather introduced to simplify the presentation of the parameters in a more concise form.

To account for the connectivities within the network as well as the directional fluidity of the individual connections, Equation 8 is combined with Equation 3:

$$G'_{x,0} \times (U_x - U_0) + G'_{x,1} \times (U_x - U_1) + \ldots + G'_{x,n} \times (U_x - U_n) = \tau(x) \times i_s \quad \text{Equation 9}$$

The term $G'_{x,y}$ can be non-zero where there is a connection from vertex x to vertex y with y taking on a value in the range of [0;n]. Additionally, the term $G'_{x,y}$ will occur in two instances: $G'_{x,y}$ and $G'_{y,x}$. Since a connection from a vertex x to a vertex y will, without limitation, under normal conditions, also imply that there is a connection from vertex y to vertex x unless such a connection is considered a one-way connection or has other asymmetric properties. For the normal case, the term $G'_{x,y}$ is to be considered equal in magnitude as $G'_{y,x}$.

Equation 9 applies to all vertices where x represents each vertex. As the same equation is applied for all vertices (x takes on a value from 0 to n), the set of simultaneous equations for the system are obtained:

$$G'_{0,1} \times (U_0 - U_1) + \ldots + G'_{0,n} \times (U_0 - U_n) = \tau(0) \times i_s$$

$$G'_{1,1} \times (U_1 - U_1) + \ldots + G'_{1,n} \times (U_1 - U_n) = \tau(1) \times i_s$$

$$\ldots$$

$$G'_{n,1} \times (U_n - U_1) + \ldots + G'_{n,n} \times (U_n - U_n) = \tau(n) \times i_s \quad \text{Equation 10}$$

Equation 10 is expanded to $$G'_{0,1} \times U_0 - G'_{0,1} \times U + G'_{0,2} \times U_0 - G'_{0,2} \times U_2 + \ldots + G'_{0,n} \times U_0 - G'_{0,n} \times U_n = \tau(0) \times i_s$$

$$G'_{1,1} \times U_1 - G'_{1,1} \times U_1 + G'_{1,2} \times U_1 - G'_{1,2} \times U_2 + \ldots + G'_{1,n} \times U_1 - G'_{1,n} \times U_n = \tau(1) \times i_s$$

$$G'_{n,1} \times U_n - G'_{n,1} \times U_1 + G'_{n,2} \times U_n - G'_{n,2} \times U_2 + \ldots + G'_{n,n} \times U_n - G'_{n,n} \times U_n = \tau(n) \times i_s \quad \text{Equation 11}$$

Equation 11 can be minimized as $$M \times k = s \quad \text{Equation 12}$$

where s, the forcing vector, is a column vector and can be represented as $$s = \begin{bmatrix} \tau(0) \times i_s \\ \tau(1) \times i_s \\ \vdots \\ \tau(n) \times i_s \end{bmatrix} \quad \text{Equation 13}$$

where τ(x) is the termination scalar and $i_s$ is the source or sink flow.

"k", the field vector, is a column vector that defines the potentials, represented as $$k = \begin{bmatrix} U_0 \\ U_1 \\ \vdots \\ U_n \end{bmatrix} \quad \text{Equation 14}$$

where $U_x$ is the potential at vertex x.

M, the system matrix, is a square matrix of size (n+1)×(n+1), represented as $$M = \begin{bmatrix} \sum_{i=0}^{n}(G'_{0,i}) & -G'_{0,1} & \cdots & -G'_{0,n} \\ -G'_{1,0} & \sum_{i=0}^{n}(G'_{1,i}) & \cdots & -G'_{1,n} \\ \vdots & \vdots & \ddots & \vdots \\ -G'_{n,0} & -G'_{1,n} & \cdots & \sum_{i=0}^{n}(G'_{n,i}) \end{bmatrix} \quad \text{Equation 15}$$

Based on the definition of ω(x,y) and Equation 7, the following holds $$G'_{1,0} = G'_{0,1} \equiv G_{0,1} \quad \text{Equation 16}$$

and thus Equation 15 is simplified to $$M = \begin{bmatrix} -\sum_{i=0}^{n}(G_{0,i}) & G_{0,1} & \cdots & G_{0,n} \\ G_{0,1} & -\sum_{i=0}^{n}(G_{1,i}) & \cdots & G_{1,n} \\ \vdots & \vdots & \ddots & \vdots \\ G_{0,n} & G_{1,n} & \cdots & -\sum_{i=0}^{n}(G_{n,i}) \end{bmatrix} \quad \text{Equation 17}$$

In some embodiments, the system matrix satisfies the linear algebraic equation. In some embodiments, the system matrix has all positive values except for the values along the diagonal where the values are negative. It should be noted that the summation terms along the diagonal greatly simplify when applied to a specific situation in that they represent the sum of connections associated with the vertex (the index of the vertex is the same as the index of the column which is the same as the index of the row). All other terms in this summation equate to zero.

As apparent to one skilled in the art, the system matrix, the field vector, and the forcing vector form a set of linearly dependent equations which yield an infinite solution space. The linearly dependency of the equations can prevent the system matrix from being inverted. In some embodiments, the equations are said to be "fixed" by applying a constant offset value to the system matrix or providing a reference point at which the solutions converge, thereby resulting in linearly independent equations. In some embodiments, a constant offset value is applied to the system matrix by applying an offset matrix to the system matrix resulting in the solutions to the set of equations having a single result.

The location of the application of the offset value is of no consequence for the purpose of this algorithm and can be defined by applying an offset matrix to the system matrix resulting in an offset system matrix, as represented by $$M' = M + D \quad \text{Equation 18}$$

where M' is the offset system matrix, M is the system matrix, and D is the offset matrix. The offset matrix is defined as $$D = \begin{bmatrix} \epsilon_0 & 0 & \cdots & 0 \\ 0 & \epsilon_1 & \cdots & 0 \\ \vdots & \vdots & \ddots & 0 \\ 0 & 0 & \cdots & \epsilon_n \end{bmatrix} \quad \text{Equation 19}$$

where $\epsilon_x$ in the offset matrix takes a value according to $$\varepsilon_x := \begin{cases} \alpha; x = [0; n] \to \text{Connectivity} \\ \alpha \text{ for } x = \beta, 0 \text{ elsewhere} \to \text{Path Finding} \end{cases} \quad \text{Equation 20}$$

where α is an offset scalar. Where the method is used to determine path finding, one element (at index β) of the diagonal is offset by the offset scalar. In such an embodiment, any element of the diagonal can be offset by the offset scalar. Where the method is used to determine connectivity, all elements of the diagonal are offset by the offset scalar. While the offset scalar can have any value where the method is used to determine the shortest path or connectivity between two vertices, where the method is used to determine connectivity the values of the offset scalar are preferably small in comparison to the values of the system matrix. The choice of the values of the offset scalar used in the method to determine connectivity or to determine the shortest path are influenced by whether the offset system matrix is used in the context of simply determining whether there is a connection between two vertices or whether the shortest path between the two vertices is of interest.

In some embodiments, the offset matrix is applied to obtain equations that can be solved. Where the method determines connectivity, the assumption does not hold that there is a path from any starting vertex to any destination vertex and thus there may be multiple sets of linearly dependent equations. By anchoring all possible vertices in the possible solution space, a unique solution can be obtained. Where the method determines the shortest path, there is the assumption that there is a path from the starting vertex to the destination vertex. Where no path from the starting vertex to the destination vertex exists, the offset matrix is used in a similar manner as used where the method determines Connectivity. Such a use can result in distorted values.

Choice of the value $\beta$, the singular diagonal entry in the offset matrix that is to have a value of $\alpha$ for the method related to determining the shortest path is, by the same argument as the selection of $\alpha$, arbitrary. Without limitation, for the purpose of this embodiment, $\beta$ is chosen as zero.

The solution of the offset system matrix equation $$M'\times k = s \qquad \text{Equation 21}$$

can be solved by inverting the offset system matrix as follows:

$$M'^{-1}\times M'\times k = M'^{-1}\times s \qquad \text{Equation 22}$$

and thus $$I \times k \equiv k = M'^{-1} \times s \overset{def}{=} M^* \times s \qquad \text{Equation 23}$$

where I is an identity matrix obtained from $M'^{-1}\times M'$ and $M^*$ is the inverse system matrix. Since the system matrix as well as the offset system matrix are square and symmetric, its inverse, the inverse system matrix, is also square and symmetric (this follows from the fact that a symmetric matrix, which is by definition also square, is identical to its Transpose). From a numerical perspective, this has the added benefit that values or data of the inverse system matrix may be compressed from consisting of $n^2$ entries to consisting of $n^*(n+1)/2$ unique entries by recognizing that the values across the diagonal may be identical and thus only one value across the diagonal is calculated.

Since the inverse system matrix has unique properties such as being symmetric (and thus square), optimizations to the inversion process can be applied which may reduce the number of steps to obtain the inverse to less than $2^*n^2$ floating point operations and will, in general, require a memory space of $2^*n^2$ for its completion. Specifically, inversion using a Gauss Elimination process can be completed without the use of row substitution.

In some embodiments, the method has the step of executing an inverse system matrix. The inverse system matrix can be related to or a function of the flow of the network. Executing the inverse of a matrix can be achieved using techniques familiar to anyone skilled in the art, for example, without limitation, the Gauss-Jordan Elimination, LU decompression, Newton's method, Cayley Hamilton method, Eigen decomposition, Blockwise inversion, analytical solution, or the like.

Once the inverse system matrix has been executed, the resulting value of the element of the inverse system matrix corresponding to the vertices in which connectivity is determined, for example, without limitation, vertex X and vertex Y, is identified. Where the identified value of the element of the inverse system matrix is a value other than zero, for example, a positive or negative value, the value indicates a connection between vertex X and vertex Y. Where the identified value of the element of the inverse system matrix is zero, the value indicates no connection between vertex X and vertex Y.

Once the inverse system matrix has been executed (which may not require determination or definition of the source and sink flows $i_{sA}$ and $i_{sB}$ in the preceding section), the inverse system matrix may be used to identify at least one vertex in the shortest path from any starting vertex to any destination vertex.

Where the network has a single start, single destination scenario, the source flow and sink flow are given a value of unity. In some embodiments, the source flow and sink flow values may be more or less than unity to suit the specifics of the network implementation.

In some embodiments, the starting vertex is defined as the current vertex. In some embodiments, the relative potentials are evaluated. Evaluating the relative potentials can have the step of evaluating the relative potentials corresponding to the neighboring vertices of the current vertex. In some embodiments, since $i_{sA}$ and $i_{sB}$ are +1 and −1 respectively, the matrix multiplication can be reduced to two columns being subtracted to arrive at the vector for the relative potentials.

In some embodiments, the current vertex is evaluated for at least one of its adjoining connections for relative flow. In some embodiments, the step of evaluating the current vertex can have the step of calculating the relative flow for at least one adjoining connection of the current vertex. The at least one adjoining connection can be at least one connection between at least one vertex and at least one neighboring vertex of the at least one vertex. In some embodiments, the at least one adjoining connection can be at least one connection between the current vertex and at least one neighboring vertex of the current vertex. In one embodiment, the relative flow of at least one adjoining connection is calculated using the relative potential of at least one of the neighboring vertices of the current vertex. The relative potentials are calculated using Equation 23:

$$k = M^* \times s = \begin{bmatrix} U_0 \\ U_1 \\ \vdots \\ U_n \end{bmatrix} \qquad \text{Equation 24}$$

From Equation 8, the relative flow within a connection is calculated using:

$$i_{x\to y} = G'_{x,y} \times (U_x - U_y) \equiv \frac{(U_x - U_y)}{P_{x,y}} \qquad \text{Equation 25}$$

The relative flow over all neighboring vertices y of the current vertex x is evaluated. In some embodiments, the relative flow is evaluated by identifying the connection with the highest relative flow. By identifying the connection with the highest relative flow, the identified connection is a connection along which a path with the smallest overall cost can be established.

The neighboring vertex adjoining the identified connection with the highest relative flow is identified as a vertex of the shortest path. At the neighboring vertex, the connection $y \to x$ would also have to be evaluated, but the value will result in the negative of $x \to y$ and can thus be disregarded with respect to the evaluation of the neighboring vertex.

A determination of whether the newly identified current vertex is the destination vertex can be made. In some embodiments, if the newly identified current vertex is not the destination vertex, the steps to determine the neighboring vertices of the current vertex with the greatest relative flow are repeated until the current vertex is the destination vertex. In some embodiments, if the newly defined current vertex neighbors the destination vertex, an evaluation of the newly defined current vertex for all its adjoining connections is not performed.

To identify another vertex of the shortest path, the neighboring vertex identified as a vertex of the shortest path is defined as the current vertex and the newly defined current vertex is evaluated for at least one of its adjoining connections for relative flow as described herein.

The network can represent a plurality of applications for which the determination of a shortest path is desired. The network can be documents and links on the Internet, a computer network topology, world-wide-web network, telephone network, electrical grid, computer game, robotics network, geographic map, social network, computer aided engineering application where functions are performed in two, three or higher dimensional space, or the like.

In some embodiments, the network is a geographic map. Here, locations, for example, without limitation, towns, cities, counties, states, attractions, or the like, are represented by vertices and connecting segments between locations, for example, without limitations, streets, roads, highways, or the like, are represented as connections. The connections have a costs according to the distance, transit time, speed limit, height or weight restriction, tolls, road type (for example, without limitation, street, highway, or the like), turn type (for example, without limitation, "left turn with stop sign", or the like), or the like. In this example, the origination vertex can be a first city, the destination vertex can be a second city, and the M* algorithm can determine the shortest transportation route from the first city to the second city.

In some embodiments, the network is the internet. Here, computer networks, for example, without limitation, personal computers, phones, servers, or the like, are represented by vertices and access means between computer networks, for example, without limitations, telephone circuits, coaxial cable, fiber optic, Wi-Fi, satellite, cellular telephone, or the like, are represented as connections. The connections can allocate costs according to the distance, transit time, transmission speed, infrastructure type (for example, without limitation, cable quality, or the like), or the like. In this example, the origination vertex can be a first computer network, the destination vertex can be a second computer network, and the M* algorithm can determine the shortest access route from the first computer network to the second computer network.

In some embodiments, the network is a social network. Here, social networks, for example, without limitation, individuals, companies, corporations, groups or the like, are represented by vertices and friendships, interactions, relationships or similar, are represented by a connection. The connections use a cost related to the level of interconnection or a simple integer value for the case where connections from one vertex to another are queried for their existence rather than the length or complexity. The M* algorithm can determine whether there is a connection from the first individual to the second.

In the following example, the method is used to determine the shortest path of a network of roads between a starting vertex and a destination vertex, where the starting vertex is the starting location of a traveler navigating the roads and the destination vertex is the desired destination of the traveler. As shown in FIG. 3Error! Reference source not found., a network Z has vertices 0-5, representing the intersection of at least two roads, with vertex 0 being the starting vertex and vertex 5 being the destination vertex, and connections Cxy, representing the roads, shown with corresponding cost Pxy. In this example, the cost values represent the amount of time required to traverse a road between two intersections. Cost values are allocated to each connection, for example, $P_{01}=10$ representing a cost of 10 to travel from vertex 0 to vertex 1 and vice versa.

Using Equation 15, the system matrix is found:

$$M = \begin{bmatrix} -(0.1+0.2) & 0.1 & 0.2 & 0 & 0 & 0 \\ 0.1 & -(0.1+0.33) & 0 & 0.33 & 0 & 0 \\ 0.2 & 0 & -(0.2+0.25+0.143) & 0.25 & 0.143 & 0 \\ 0 & 0.33 & 0.25 & -(0.33+0.25+0.5) & 0 & 0.5 \\ 0 & 0 & 0.143 & 0 & -(0.143+0.13) & 0.13 \\ 0 & 0 & 0 & 0.5 & 0.13 & -(0.5+0.13) \end{bmatrix}$$

Equation 26

An offset matrix having an offset scalar value of 0.1 as follows $$D = \begin{bmatrix} 0.1 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{bmatrix}$$

Equation 27 is applied to the system matrix resulting in the offset system matrix as follows $$M' = \begin{bmatrix} -(0.1+0.2)+0.1 & 0.1 & 0.2 & 0 & 0 & 0 \\ 0.1 & -(0.1+0.33) & 0 & 0.33 & 0 & 0 \\ 0.2 & 0 & -(0.2+0.25+0.143) & 0.25 & 0.143 & 0 \\ 0 & 0.33 & 0.25 & -(0.33+0.25+0.5) & 0 & 0.5 \\ 0 & 0 & 0.143 & 0 & -(0.143+0.13) & 0.13 \\ 0 & 0 & 0 & 0.5 & 0.13 & -(0.5+0.13) \end{bmatrix}$$

Equation 28

Inversion of this matrix yields the inverse system matrix:

$$M^* = \begin{bmatrix} 10.0 & 10.0 & 10.0 & 10.0 & 10.0 & 10.0 \\ 10.0 & 4.704 & 7.648 & 6.13 & 7.012 & 6.312 \\ 10.0 & 7.648 & 6.176 & 6.935 & 6.494 & 6.844 \\ 10.0 & 6.13 & 6.935 & 4.957 & 6.106 & 5.194 \\ 10.0 & 7.012 & 6.494 & 6.106 & 2.269 & 5.314 \\ 10.0 & 6.312 & 6.844 & 5.194 & 5.314 & 3.632 \end{bmatrix} \quad \text{Equation 29}$$

The values of the inverse system matrix are used to identify at least one vertex in the shortest path. By defining the starting vertex as the current vertex, the vertex 0 is defined as the current vertex. Thus vertex 0 is evaluated for all its adjoining connections for relative flow.

To evaluate the adjoining connections of vertex 0, the potentials of the neighboring vertices are evaluated according to Equation 23:

$$k = M^* \times s = \begin{bmatrix} 0 \\ -3.688 \\ -3.156 \\ -4.806 \\ -4.686 \\ -6.368 \end{bmatrix} \quad \text{Equation 30}$$

At the current vertex, vertex 0, the relative flow between vertex 0 and the neighboring vertices, vertex 1 and vertex 2 is evaluated according to Equation 8, resulting in:

$$i_{0 \rightarrow 1} = \frac{(U_0 - U_1)}{P_{0,1}} = \frac{\{0 - (-3.688)\}}{10} = 0.369 \quad \text{Equation 31}$$

And $$i_{0 \rightarrow 2} = \frac{(U_0 - U_2)}{P_{0,2}} = \frac{\{0 - (-3.156)\}}{5} = 0.631 \quad \text{Equation 32}$$

Where the value of $i_{0 \rightarrow 1}$ is the relative flow between vertex 0 and vertex 1 and $i_{0 \rightarrow 2}$ is the relative flow between vertex 0 and vertex 2. The value of $i_{0 \rightarrow 2}$ is larger than $i_{0 \rightarrow 1}$ so vertex 2 is identified as one vertex in the shortest path.

Vertex 2 is defined as the current vertex. Vertex 2 is determined not to be the destination vertex, and thus vertex 2 is evaluated for all its adjoining connections for relative flow.

The neighboring vertices of the newly defined current vertex, or the neighboring vertices of vertex 2 are evaluated the adjoining connections of vertex 0, the potentials of the neighboring vertices are evaluated. At the newly defined current vertex, vertex 2, the relative flow between vertex 2 and the neighboring vertices, vertex 0, vertex 3 and vertex 4, is evaluated. Application of Equation 8 results in:

$$i_{2 \rightarrow 3} = \frac{(U_2 - U_3)}{P_{2,3}} = \frac{\{-3.156 - (-4.806)\}}{4} = 0.4125 \quad \text{Equation 33}$$

and $$i_{2 \rightarrow 4} = \frac{(U_2 - U_4)}{P_{2,4}} = \frac{\{-3.156 - (-4.686)\}}{7} = 0.2186 \quad \text{Equation 34}$$

The computation of $i_{2 \rightarrow 0}$ is not performed according to the definition of w(x,y) in Equation 7.

The value of $i_{2 \rightarrow 3}$ is larger than $i_{2 \rightarrow 4}$ and $i_{2 \rightarrow 0}$ so vertex 3 is identified as one vertex in the shortest path. Vertex 3 is defined as the current vertex. Vertex 3 is determined not to be the destination vertex, and thus vertex 3 is evaluated for all its adjoining connections for relative flow.

In this example, the method continues until vertex 5 is identified as a vertex in the shortest path and the determination is made that vertex 5 is the destination vertex. Since the vertices, 0, 2, 3, and 5 are identified as vertices in the shortest path, the shortest path for the traveler would be a progression from vertex 0 to vertex 2 to vertex 3 to vertex 5.

Figure 3:
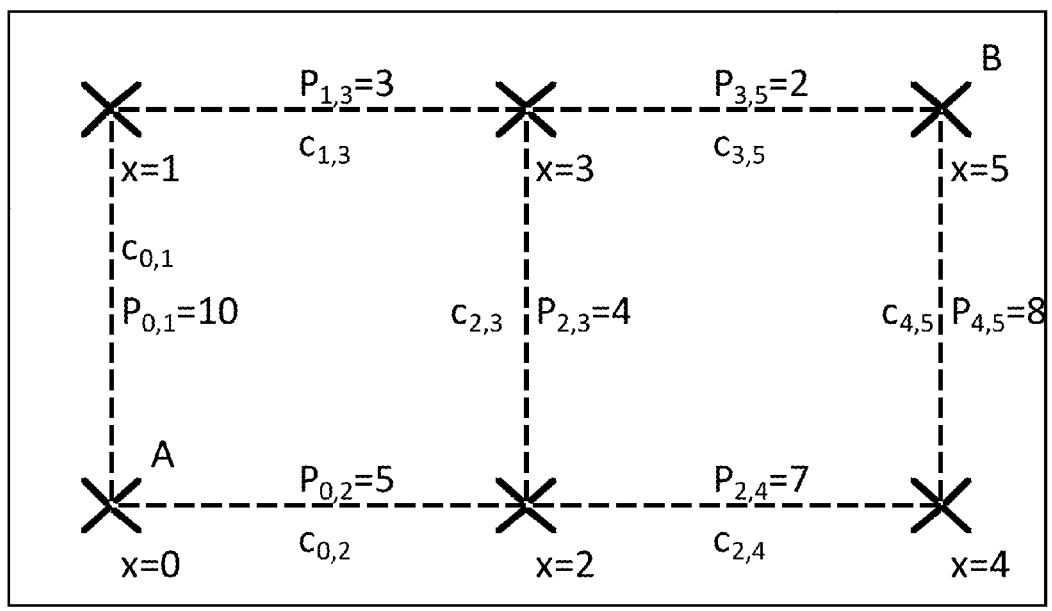
FIG. 3 is a representation of a network according to an exemplary embodiment.

In the following example, the method is used to determine the connectivity of a network circuitry between a starting vertex and at least one other vertex in network. As shown in FIG. 3,Error! Reference source not found. a network Z has vertices 0-5, representing the intersection of at least two electronic devices, with vertex 0 being the starting vertex and vertex 4 being another vertex in the network, and connections Cxy, representing the electrical connections, shown with corresponding cost Pxy. In this example, the cost values represent the amount of time required to traverse an electrical connection between two electronic devices. Cost values are allocated to each connection, for example, $P_{01}=10$ representing a cost of 10 to traverse from vertex 0 to vertex 1 and vice versa.

Using Equation 15, the system matrix is found:

$$M = \begin{bmatrix} -(0.1+0.2) & 0.1 & 0.2 & 0 & 0 & 0 \\ 0.1 & -(0.1+0.33) & 0 & 0.33 & 0 & 0 \\ 0.2 & 0 & -(0.2+0.25+0.143) & 0.25 & 0.143 & 0 \\ 0 & 0.33 & 0.25 & -(0.33+0.25+0.5) & 0 & 0.5 \\ 0 & 0 & 0.143 & 0 & -(0.143+0.13) & 0.13 \\ 0 & 0 & 0 & 0.5 & 0.13 & -(0.5+0.13) \end{bmatrix} \quad \text{Equation 35}$$

An offset matrix having an offset scalar value of 0.1 as follows $$D = \begin{bmatrix} 0.1 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{bmatrix} \quad \text{Equation 36}$$

is applied to the system matrix resulting in the offset system matrix as follows $$M = \begin{bmatrix} -(0.1+0.2)+0.1 & 0.1 & 0.2 & 0 & 0 & 0 \\ 0.1 & -(0.1+0.33) & 0 & 0.33 & 0 & 0 \\ 0.2 & 0 & -(0.2+0.25+0.143) & 0.25 & 0.143 & 0 \\ 0 & 0.33 & 0.25 & -(0.33+0.25+0.5) & 0 & 0.5 \\ 0 & 0 & 0.143 & 0 & -(0.143+0.13) & 0.13 \\ 0 & 0 & 0 & 0.5 & 0.13 & -(0.5+0.13) \end{bmatrix} \quad \text{Equation 37}$$

Inversion of this matrix yields the inverse system matrix:

$$M^* = \begin{bmatrix} 10.0 & 10.0 & 10.0 & 10.0 & 10.0 & 10.0 \\ 10.0 & 4.704 & 7.648 & 6.13 & 7.012 & 6.312 \\ 10.0 & 7.648 & 6.176 & 6.935 & 6.494 & 6.844 \\ 10.0 & 6.13 & 6.935 & 4.957 & 6.106 & 5.194 \\ 10.0 & 7.012 & 6.494 & 6.106 & 2.269 & 5.314 \\ 10.0 & 6.312 & 6.844 & 5.194 & 5.314 & 3.632 \end{bmatrix} \quad \text{Equation 38}$$

The values of the inverse system matrix are used to determine connectivity between the starting vertex, vertex 0, and another vertex in the network, vertex 4. By defining the starting vertex as the current vertex, the vertex 0 is defined as the current vertex. Thus vertex 0 is evaluated for its connectivity with vertex 4. The resulting value of the inverse system matrix corresponding to the vertex 0 and vertex 4 is identified. Since the value is other than zero, the value indicates a connection between vertex 0 and vertex 4 and thus connectivity between vertex 0 and vertex 4 is present.

This approach is similar to one that anyone experienced in the art of electronic circuit analysis would be familiar with but differs in that the source and sink terms ($i_{sA}$ and $i_{sB}$) are explicitly included here whereas circuit analysis will usually try to exclude or replace them so as to obtain a set of linearly independent equations.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

Modifications and variations of the present invention are possible in light of the above teachings. It is therefore to be understood that the invention may be practiced otherwise than as specifically described herein.

What is claimed is:

1. A computer implemented method for determining a shortest path within a real-world network of roads and intersections, the method comprising the steps of:

providing on and executing computer-readable media by a computer machine;

wherein, the starting vertex location, a and destination vertex location are transmitted to and received by the computer executing the method, and the computer has access to the definition of one or more road connections, either directly or through an access to a matrix that defines the road connections;

determining a shortest path of a real-world network of vertices and road connections that models real-world travel conditions where functions are performed in at least two dimensional space as a set of relationships among a tangible road network;

a vertex is defined as the intersection of multiple road sections;

determining path finding on a topographic road map by the following steps;

allocating a cost value to each road connection;

assigning a potential value to the starting vertex location;

assigning a potential value to the destination vertex location;

executing a static, reusable-inverse of the system matrix related to a flow of the real-world road network;

calculating the relative flow of a road and intersection connections over all neighboring vertices of each vertex in that at each vertex the direction of travel can be determined simply by calculating the flow for each of the attached roads without having to actually follow or compute this path to the actual destination vertex; and determining the shortest path of a road and intersection network by evaluating the relative flow at each location and following the path of maximum scalar flow value over the roads and intersections to the destination or any intermediate stop along this path is possible without requiring that the entire path is calculated.

2. The method of claim 1, further comprising the step of generating a static, reusable inverse of the system matrix comprising the steps of:

providing on and executing computer-readable media by a computer machine for building a network using the equations:

$$\Sigma i_x = 0$$

and $$i_{x \to y} = \frac{U_x - U_y}{P_{x,y}}$$

where $i_x$ is a flow over a vertex X, $I_{x \to y}$ is a directional flow from a vertex X to an adjoining vertex Y,
$U_x$ is a potential of vertex X, a starting point,
$U_y$ is a potential of vertex Y, a destination point, and
$P_{x,y}$ is a cost of the connection between vertex X and vertex Y and is the specific quantity that the method seeks to minimize over the path, which would be equivalent to distance or time depending on the goal of the traversal,
minimizing to Mk=s, where M is a system matrix of size (n+1)×(n+1), k;
the potentials $U_x$ and $U_y$, and s defines the flow (a measure of how directed the road is towards the destination),
the solution of the two previous steps, minimizing the matrix size and defining the flow by the potentials, creates the matrix that will be repeatedly used in the next steps;
applying an offset matrix to the system matrix, required to make the equations linearly independent, resulting in an offset system matrix, and
inverting the offset system matrix, which is dependent of the specific network configuration but independent of the start and end locations, resulting in an inverse system matrix.

3. The method of claim 2, wherein the shortest path of the real-world network of roads and intersections is the shortest path, the shortest path starts at a starting vertex location and ends at a destination vertex location, and the offset matrix is applied to the system matrix with one non-zero element on the diagonal thereby making the set of equations linearly independent.

4. The method of claim 3, further comprising the steps of:
a. calculating a relative flow of at least one road connection between at least one vertex location and at least one neighboring vertex location of the at least one vertex location, and
b. determining the shortest path of a real-world network of roads and intersections by evaluating the relative flow of each road connection.

5. The method of claim 4, wherein the step of evaluating the relative flow of each road connection evaluates the relative flow of each road connection over all neighboring vertices of each vertex location, said step comprises the steps of:
a. defining the starting vertex location as a current vertex location,
b. identifying a road connection of the current vertex location with the highest relative flow,
c. identifying the neighboring vertex location adjoining the road connection with the highest relative flow as a vertex location of the shortest path,
d. defining the neighboring vertex location identified as a vertex location of the shortest path as the current vertex location, and e. if the current vertex location is not the destination vertex location, repeat steps (b)-(e).

6. The method of claim 2, wherein the shortest path of the real-world network of roads and intersections is the connectivity between two vertices of a real-world network of roads and intersections and an offset matrix is applied to the system matrix with all non-zero elements on the diagonal, thereby ensuring that the matrix is invertible, irrespective of which locations are connected with which, by means of any number of roads, otherwise it is possible that some groups of roads and locations are not otherwise connected and would thus prevent the matrix from being inverted.

7. The method of claim 5, wherein the step of evaluating the relative flow of each road connection evaluates the relative flow of each road connection over all neighboring vertices of each vertex location, said step comprises the steps of:
determining a value of an element in the inverse system matrix corresponding to two vertices of the real-world network of roads and intersections, and
identifying the connectivity between the two vertices of the real-world network of roads and intersections, where connectivity exists if the value of the element of the inverse system matrix is not zero and connectivity does not exist if the value of the element of the inverse system matrix is zero.

8. The method of claim 2, wherein the step of building a network uses:

$$G_{x,y} \stackrel{def}{=} \frac{1}{P_{x,y}}$$

where $G_{x,y}$ is a fluidity of a road connection and $P_{x,y}$ is the cost of a road connection.

9. The method of claim 8, wherein the step of building a network uses:

$$G'_{x,y} \stackrel{def}{=} \omega(x,y) \times G_{x,y} \equiv \frac{\omega(x,y)}{P_{x,y}}$$

where $G'_{x,y}$ is a directional fluidity of a road connection and w(x,y) is a connectivity scalar between a vertex X and a vertex Y, the connectivity scalar indicating whether a road connection exists between vertex X and vertex Y.

10. The method of claim 2, wherein the step of building a network uses:

$$\tau(x) := \begin{cases} \text{Source} \to \tau(x) = -1 \\ \text{Sink} \to \tau(x) = 1 \\ \text{Otherwise} \to \tau(x) = 0 \end{cases}$$

where $\tau(x)$ is a terminal scalar for indicating a net flux of flow of the real-world network of roads and intersections at the vertex X location.

11. A computer implemented method for determining a shortest path within a real-world physical computer or server network, the network having a plurality of computers and a plurality of network connections, wherein at least one of the plurality of computers and servers is defined as a starting computer or server location, and at least one of the plurality of vertices is defined as a destination computer or server location, the method comprising the steps of:
allocating a cost value to each network connection, a potential value to the starting computer location;
allocating a potential value to the destination computer or server location,
a vertex being defined as the intersection of multiple network connections, or paths;
transmitting the information about the starting location and destination location to the implementing computer for processing;
and executing an inverse system matrix related to a flow of data or information of the real-world physical network of computer and server locations to determine the fastest connection for transferring data or information along the real-world physical computer and server network.

12. The method of claim 11, further comprising the instruction of generating a static, reusable inverse of the system matrix comprising the instructions of:
providing on and executing computer-readable media by a computer machine for building a representative network model using the equations:

$$\Sigma i_x = 0$$

and $$i_{x \to y} = \frac{U_x - U_y}{P_{x,y}}$$

where $i_x$ is a flow over a vertex X, $i_{x \to y}$ is a directional flow from a vertex X to an adjoining vertex Y,
$U_x$ is a potential of vertex X a starting point,
$U_y$ is a potential of vertex Y, a destination point, and
$P_{x,y}$ is a cost of the network connection between vertex X and vertex Y, and is the specific quantity that the method seeks to minimize over the path, which would be equivalent to distance or time depending on the goal of the traversal,
minimizing to Mk=s, where M is a system matrix of size (n+1)×(n+1), k
the potentials $U_x$ and $U_y$, and s defines the flow, a measure of how directed the data or information is along the real-world physical computer network towards the destination,
the solution of the two previous steps, minimizing the matrix size and defining the flow by the potentials, creates the matrix that will be repeatedly used in the next steps;
applying an offset matrix to the system matrix, required to make the equations linearly independent, resulting in an offset system matrix, and
inverting the offset system matrix, which is dependent of the specific network configuration but independent of the start and end locations, resulting in an inverse system matrix.

13. The method of claim 12, wherein the shortest path of the real-world physical computer network is the shortest path wherein, the shortest path starts at a starting vertex network location and ends at a destination vertex network location, and the offset matrix is applied to the system matrix with one non-zero element on the diagonal thereby making the set of equations linearly independent.

14. The method of claim 13, further comprising the steps of:
a. calculating a relative flow of at least one network connection between at least one vertex location and at least one neighboring vertex network location of the at least one vertex network location, and
b. determining the shortest path of a real-world physical computer network by evaluating the relative flow of each network connection, hub, and intersection connection.

15. The method of claim 14, wherein the instruction of evaluating the relative flow of each network connection, hub, and intersection connection evaluates the relative flow of each network connection, hub, and intersection connection over all neighboring vertices of each vertex network location, said instruction comprising the instructions of:
a. defining the starting vertex network location as a current vertex network location,
b. identifying the network connection with the highest relative flow,
c. identifying the neighboring vertex network location adjoining the network connection with the highest relative flow as a vertex network location of the shortest path,
d. defining the neighboring vertex network location identified as a vertex network location of the shortest path as the current vertex location, and
e. if the current vertex network location is not the destination vertex network location, repeat steps (b)-(e) path.

16. The method of claim 12, wherein the shortest path of the real-world physical computer network is the connectivity between two vertices of a real-world network of network connections, hubs, and intersections and the offset matrix is applied to the system matrix with all non-zero elements on the diagonal, thereby ensuring that the matrix is invertible, irrespective of which locations are connected with which, by means of any number of network connections, hubs, and intersections, otherwise it is possible that some groups of network connections, hubs, and intersections are not otherwise connected and would thus prevent the matrix from being inverted.

17. The method of claim 15, wherein the instruction of evaluating the relative flow of each network, hub, and intersection connection evaluates the relative flow of each network, hub, and intersection connection over all neighboring vertices of each vertex network, hub, and intersection location, said instruction comprises the instructions of:
determining the value of the element in the inverse system matrix corresponding to two vertices of the real-world network of network, hub, and intersection connections, and
identifying the connectivity between the two vertices of the real-world network of network, hub, and intersection connections, where connectivity exists if the value of the inverse system matrix is not zero and connectivity does not exist if the value of the element of the inverse system matrix is zero.

18. The method of claim 12, wherein the instruction of building a network uses:

$$G'_{x,y} \stackrel{def}{=} \frac{1}{P_{x,y}}$$

where $G'_{x,y}$ is a fluidity of a network, hub, or intersection connection and $P_{x,y}$ is the cost of a network, hub, or intersection connection.

19. The non-transitory computer readable storage medium of claim 18, wherein the instruction of building a network uses:

$$G'_{x,y} \stackrel{def}{=} \omega(x, y) \times G_{x,y} \equiv \frac{\omega(x, y)}{P_{x,y}}$$

where $G'_{x,y}$ is a directional fluidity of a network, hub, or intersection connection and $w(x,y)$ is a connectivity scalar between a vertex X and a vertex Y, the connectivity scalar indicating whether a network, hub, or intersection connection exists between vertex X and vertex Y.

20. The method of claim 12, wherein the instruction of building a network uses:

$$\tau(x) := \begin{cases} \text{Source} \to \tau(x) = -1 \\ \text{Sink} \to \tau(x) = 1 \\ \text{Otherwise} \to \tau(x) = 0 \end{cases}$$

where $\tau(x)$ is a terminal scalar for indicating a net flux of flow of the real-world physical computer network at the vertex X.

* * * * *